United States Patent [19]

Sohda et al.

[11] Patent Number: 5,523,035
[45] Date of Patent: Jun. 4, 1996

[54] PROCESS FOR PRODUCING CARBONACEOUS MATERIAL

[75] Inventors: Yoshio Sohda, Machida; Yukinori Kude; Takefumi Kohno, both of Yokohama; Hiroshi Makino, Hino, all of Japan

[73] Assignee: Nippon Oil Co., Ltd., Tokyo, Japan

[21] Appl. No.: 122,198

[22] Filed: Sep. 15, 1993

Related U.S. Application Data

[63] Continuation-in-part of Ser. No. 964,936, Oct. 22, 1992, abandoned, which is a continuation of Ser. No. 611,936, Nov. 9, 1990, abandoned.

[30] Foreign Application Priority Data

Nov. 15, 1989 [JP] Japan ................................ 1-294956

[51] Int. Cl.$^6$ .............................. C01B 31/00; B05D 3/02
[52] U.S. Cl. ........................ 264/29.6; 264/29.7; 427/227; 427/228
[58] Field of Search ................... 264/29.1, 29.6, 264/29.7, 82, 234; 427/227, 249, 255, 419.1, 419.2, 419.7

[56] References Cited

U.S. PATENT DOCUMENTS

| | | | |
|---|---|---|---|
| 4,275,095 | 6/1981 | Warren | 427/228 |
| 4,476,178 | 10/1984 | Veltri et al. | 428/215 |
| 4,859,503 | 8/1989 | Bouix et al. | 427/249 |
| 5,093,156 | 3/1992 | Uemura et al. | 427/249 |
| 5,284,685 | 2/1994 | Rousseau | 427/574 |

*Primary Examiner*—Christopher A. Fiorilla
*Attorney, Agent, or Firm*—Bucknam and Archer

[57] ABSTRACT

A process for producing a carbon/carbon composite having a ceramic and carbon coating on its surface consists essentially of the steps of heating a carbon/carbon composite at a temperature of from 800° to 1,700° C., contacting the thus heated composite in the presence of hydrogen with at least one compound selected from the group consisting of halides and hydrides of Si, Zr, Ti, Hf, B, Nb and W in gaseous form to convert the surface of the carbon/carbon composite, in the absence of a carbon releasing gas, into a carbide ceramic layer and then forming a coating film consisting of both carbon and ceramic by vapor phase decomposition at a pressure of 5–100 Torr on said carbide ceramic.

12 Claims, No Drawings

PROCESS FOR PRODUCING CARBONACEOUS MATERIAL

This application is a Continuation-in-part of U.S. Ser. No. 07/964,936, filed Oct. 22, 1992, now abandoned, which was a Continuation of U.S. Ser. No. 07/611,936 filed Nov. 9, 1990 now abandoned.

BACKGROUND OF THE INVENTION

1. Field of the Invention

The present invention relates to a process for producing a carbonaceous material. In particular, the present invention relates to a process for producing a carbonaceous material having an excellent oxidation resistance.

2. Prior Art

A carbon/carbon composite capable of maintaining its high strength and high modulus even at a temperature as high as 1,000° C. or above in an inert gas and having a low coefficient of thermal expansion is expected to be used as a material for the parts of aircrafts and space crafts, brakes and furnace materials. However, this material has such a poor oxidation resistance that oxidative consumption begins at around 500° C. in air. To overcome this defect, an attempt has been made to form a ceramic coating on the surface of the carbon/carbon composite in order to improve its oxidation resistance. However, the essential function of the coating cannot be fully obtained, since the coating is peeled off or cracked because of a difference in the coefficient of thermal expansion between the carbon/carbon composite used as the substrate and the ceramic.

SUMMARY OF THE INVENTION

After investigations made for the purpose of providing a process for producing a carbonaceous material having an excellent oxidation resistance and solving the above-described problems, the inventors have completed the present invention.

The present invention relates to a process for producing a carbonaceous material characterized by heating a carbon/carbon composite, bringing it into contact with an element or a compound of said element capable of forming a heat-resistant carbide on the surface thereof to convert the surface of the carbon/carbon composite into carbide ceramics or both of said surface and part of the interior thereof, and forming a coating film comprising a ceramic or both a ceramic and carbon on the convert surface by vapor phase decomposition.

DETAILED DESCRIPTION OF THE PREFERRED EMBODIMENTS

The present invention will now be described in detail.

The carbon/carbon composite used as the base in the present invention comprises carbon fibers and a carbonaceous matrix, etc. The volume fraction of the carbon fibers is usually 10 to 70%, preferably 20 to 60%.

The carbon fibers constituting the carbon/carbon composite include various ones such as pitch, polyacrylonitrile and rayon carbon fibers, among which the pitch based carbon fiber is preferred, because it can readily enhance the oxidation resistance.

The carbon fiber is used usually in the form of a bundle of 500 to 25,000 continuous fibers. Further carbon fibers in the form of a laminate of unidirection, two-dimensional textile or a laminate thereof, three-dimensional textile, or two-dimensional or three-dimensional moldings of carbon fibers in the form of mat or felt, among which the three-dimensional textile is particularly preferred.

The carbonaceous matrix includes those prepared by carbonizing a carbonaceous pitch, those prepared by carbonizing a carbonizable resin such as a phenolic resin or furan resin and those prepared by chemical vapor deposition (CVD), among which those prepared by carbonizing the carbonaceous pitch are particularly preferred.

The carbonaceous pitch ordinarily used includes coal and petroleum pitches each having a softening point of 100° to 400° C., preferably 150° to 350° C. The carbonaceous pitch may be an optically isotropic or anisotropic pitch or a mixture thereof, and particularly preferred is an optically anisotropic pitch having an optically anisotropic phase content of usually 60 to 100% by volume, most desirably 80 to 100% by volume.

The process for producing the carbon/carbon composites used as the base in the present invention is not particularly limited and any known process can be employed.

This material can be produced by, for example, impregnating a textile or a molding of the carbon fiber with the carbonaceous pitch, phenolic resin or furan resin and carbonizing it under atmospheric or elevated pressure or under a press. The impregnation is conducted by melting the carbonaceous pitch or the like through heating in vacuum.

The carbonization under atmospheric pressure can be conducted by heating to 400° to 3,000° C. in an atmosphere of an inert gas such as argon, nitrogen or helium. The carbonization under elevated pressure can be conducted by heating to 400° to 3,000° C. under an isostatic pressure of usually 50 to 10,000 kg/cm$^2$, preferably 200 to 2,000 kg/cm$^2$ with an inert gas. The carbonization under a press can be conducted by heating to 400° to 3,000° C. under uniaxial pressure of 10 to 500 kg/cm$^2$ with a hot press or the like.

After the completion of the carbonization, the product can be preferably carbonized or graphitized under atmospheric pressure. The carbonization or graphitization can be conducted by heating to 400° to 3,000° C. in an inert atmosphere.

In the present invention, the surface of the heated carbon/carbon composite is brought into contact with an element or a compound of said element capable of forming a heat-resistant carbide thereon to convert the surface of the carbon/carbon composite into carbide ceramics or both said surface and the interior thereof by the chemical reaction of carbon of the carbon/carbon composite with said element or its compound.

The carbides include SiC, ZrC, TiC, HfC, B$_4$C, NbC and WC, among which SiC, ZrC, TiC and HfC are particularly preferred. The elements capable of forming a heat-resistant carbide include Si, Zr, Ti, Hf, B, Nb and W, while the compounds of these elements include halides and hydrides thereof. For example, Si, SiCl$_4$ or SiH$_4$ is usable for forming SiC; Zr or ZrCl$_4$ is usable for forming ZrC; Ti or TiCl$_4$ is usable for forming TiC; and Hf or HfCl$_4$ is usable for forming HfC. The element or its compound capable of forming a heat-resistant carbide is used usually in gaseous form to be brought into contact with the carbon/carbon composite for reaction.

The carbide forming reaction is preferably conducted in the presence of hydrogen. The amount of hydrogen used may be determined without any limitation depending on the reaction temperature, amount of the feed gas, amount of the fiber, structure of the furnace, etc. For example, it is not larger than 5 parts by volume, preferably 0.01 to 5 parts by volume, per unit volume of the element or its compound capable of forming the carbide.

The carbide forming reaction is preferably conducted under atmospheric or reduced pressure. The pressure is usually 0.1 to 760 mmHg, preferably 10 to 760 mmHg and more preferably 50 to 760 mmHg.

The reaction atmosphere may be diluted with $N_2$, Ar, He, Ne, Kr, Xe, Rn or other inert gases.

The temperature of heating the carbon/carbon composite is usually 800° to 1,700° C., preferably 1,000° to 1,500° C. When the temperature is lower than 800° C., no carbide coating having a sufficient thickness can be obtained and, on the contrary, when it exceeds 1,700° C., no homogeneous, dense carbide coating can be obtained.

The method of heating the carbon/carbon composite is not particularly limited. For example, a method wherein the carbon/carbon composite is heated with an induced current, a method wherein this material is externally heated or a method wherein an electric current is directly applied to the carbon/carbon composite to heat the latter can be employed.

The carbide forming reaction time can be determined without any limitation. It is usually about 1 min. to about 10 hrs.

The thickness of the carbide coating which is determined depending on the use without any limitation is usually 0.1 to 500 μm, preferably 0.5 to 200 μm. When the thickness of the coating film is less than 0.1 μm, the adhesion between the carbon/carbon composite and the coating film comprising a ceramic or both of a ceramic and carbon is insufficient to cause the peeling or cracking of the coating film.

The weight gain of the material after the carbide coating formation is usually not more than 15%, preferably not more than 10% and more preferably not more than 5%. When the thickness of the carbide coating exceeds 1 μm, the strength of the carbon/carbon composite might be reduced by the formation of the carbide coating. However, a sufficient strength of this material can be kept by using a carbon fiber having less reactivity, such as a high-modulus pitch carbon fiber, as the carbon fiber which is the main factor of controlling the strength and also by using less or no graphitizable matrix such as a thermosetting resin.

In the present invention, a coating film comprising a ceramic or both of a ceramic and carbon is formed on the surface of the carbide by vapor phase decomposition. This is usually called CVD and includes thermal CVD, plasma CVD and optical CVD.

The ceramics include carbides, nitrides, borides and oxides such as SiC, ZrC, TiC, HfC, $B_4C$, NbC, WC, $TiB_2$, BN and $Si_3N_4$, among which SiC, ZrC, TiC and HfC are particularly preferred. These ceramics can be deposited together with carbon.

The CVD gases to be used for obtaining the carbon include hydrocarbons, particularly those having 1 to 6 carbon atoms, such as methane, natural gases, propane and benzene.

The CVD gases to be used for obtaining the ceramics include halides, hydrides and organometallic compounds of elements such as Si, Zr, Ti, Hf, B, Nb and W and mixtures of them with the above-described hydrocarbon gas, hydrogen or inert gas. For example, $SiCl_4$, $CH_3SiCl_3$, $(CH_3)_2SiCl_2$ or $SiH_4$ is usable for forming SiC; $ZrCl_4$ is usable for forming ZrC; $TiCl_4$ is usable for forming TiC; and $HfCl_4$ is usable for forming HfC.

The thickness of the coating film is suitably determined depending on the use thereof. It is usually 1 to 2,000 μm, preferably 5 to 1,000 μm. When the thickness is less than 1 μm, the oxidation resistance is insufficient.

In the present invention, after the surface or both of the surface and part of the inner of the carbon/carbon composite are converted into carbide ceramics, it may be further heat-treated. Thus the carbide can be stabilized.

The heat treatment is conducted at a temperature of usually 1,000° to 3,000° C., preferably 1,200° to 3,000° C., in an inert gas or under reduced pressure. It is particularly desirable that the heat treatment be conducted at a temperature equal to or higher than the carbonization temperature. The heat treatment time ranges 1 min. to 10 hrs., while the heating method is not particularly limited.

The heat treatment is conducted in an inert gas or under reduced pressure. The inert gases usable herein include $N_2$, Ar, He, Kr, Xe and Rn. The reduced pressure ranges from $10^{-3}$ to less than 760 mmHg, preferably 0.1 to 500 mmHg.

The effect of the present invention resides in that a carbonaceous material free from the cracking or peeling of the coating film and having an excellent oxidation resistance can be produced.

PREFERRED EMBODIMENTS OF THE PRESENT INVENTION

The following Examples will further illustrate the present invention, which by no means limit the invention.

EXAMPLE 1

A carbon/carbon composite comprising an orthogonal three-dimensional textile prepared from 2,000 pitch carbon fibers having a diameter of 10 μm (in Z-axis direction) and 4,000 same fibers (in X-axis and Y-axis directions) as the reinforcing fibers and a petroleum pitch as the matrix material was heated to 1,400° C. in a reaction vessel and kept at this temperature for 60 min. under atmospheric pressure while introducing a gaseous mixture of $SiCl_4$ and $H_2$ ($H_2/SiCl_4$=0.25) thereinto. Then SiC was deposited on the surface thereof by using a gaseous mixture of $CH_3SiCl_3$ and $H_2$ ($H_2/CH_3SiCl_3$=10) as the starting gas by conducting thermal CVD at 1,350° C. under a pressure of 5 Torr for 5 hrs. to form a coating film.

The product was observed with a scanning electron microscope to find that neither cracks nor peeling was recognized on the surface of the carbon/carbon composite, at the interface between the carbon/carbon composite and the carbide, at the interface between the carbide and the ceramic coating or on the surface of the ceramic coating.

The oxidation resistance of the obtained carbonaceous material was examined by heating it at 600° C. in air for 2 hrs. and then determining the weight change thereof. The weight loss was 9.8%.

COMPARATIVE EXAMPLE 1

SiC was deposited on the surface of the same carbon/carbon composite as that of Example 1 by conducting thermal CVD by using a gaseous mixture of $CH_3SiCl_3$ and $H_2$ ($H_2/CH_3SiCl_3$=10) as the starting gas at 1,350° C. to form a coating film.

The product was observed with a scanning electron microscope to find that SiC was deposited on the surface of the carbon/carbon composite. However, cracks and peeling were recognized at the interface between the carbon/carbon composite and the carbide.

COMPARATIVE EXAMPLE 2

The same carbon/carbon composite as that of Example 1 was heated to 1,400° C. in a reaction vessel and kept at this temperature for 60 min. while introducing a gaseous mixture of $SiCl_4$ and $H_2$ ($H_2/SiCl_4$=0.25) thereinto under atmospheric pressure.

The oxidation resistance of the product was examined in the same manner as that of Example 1 to find that the weight loss was 21.4%.

EXAMPLE 2

The same carbon/carbon composite as that of Example 1 was heated to 1,300° C. in a reaction vessel and kept at this temperature for 2 hrs. while introducing a gaseous mixture of $SiCl_4$ and $H_2$ ($H_2/SiCl_4$=0.25) thereinto under atmospheric pressure. Then SiC was deposited on the surface thereof by conducting thermal CVD using a gaseous mixture of $CH_3SiCl_3$ and $H_2$ ($H_2/CH_3SiCl_3$=10) as the starting gas at 1,350° C. under a pressure of 50 Torr for 3 hrs.

The product was observed with a scanning electron microscope to find that neither cracks nor peeling was recognized on the surface of the carbon/carbon composite, at the interface between the carbon/carbon composite and the carbide, at the interface between the carbide and the ceramic coating or on the surface of the ceramic coating.

EXAMPLE 3

The same carbon/carbon composite as that of Example 1 was heated to 1,300° C. in a reaction vessel and kept at this temperature for 2 hrs. while introducing a gaseous mixture of $SiCl_4$ and $H_2$ ($H_2/SiCl_4$=0.25) thereinto under atmospheric pressure. After the heat treatment at 1,700° C. in argon gas for 30 min. SiC was deposited on the surface thereof by conducting thermal CVD using a gaseous mixture of $CH_3SiCl_3$ and $H_2$ ($H_2/CH_3SiCl_3$=10) as the starting gas at 1,350° C. under a pressure of 50 Torr for 3 hrs. to form another coating film.

The product was observed with a scanning electron microscope to find that neither cracks nor peeling was recognized on the surface of the carbon/carbon composite, at the interface between the carbon/carbon composite and the carbide, at the interface between the carbide and the ceramic coating or on the surface of the ceramic coating.

The oxidation resistance of the product was examined in the same manner as that of Example 1 to fined that the weight loss was 9.1%.

EXAMPLE 4

The same carbon/carbon composite as that of Example 1 was heated to 1,300° C. in a reaction vessel and kept at this temperature for 2 hrs. while introducing a gaseous mixture of $SiCl_4$ and $H_2$ ($H_2/SiCl_4$=0.25) thereinto under atmospheric pressure. Then it was subjected to thermal CVD by feeding 40 cm$^3$/min. (under normal conditions) of $C_3H_8$ as the starting gas onto its surface at 1,150° C. under a pressure of 50 Torr. Then the pressure was altered to 100 Torr and the starting gas was replaced with a gaseous mixture of $C_3H_8$ (40 cm$^3$/min.), $SiCl_4$ (170 cm$^3$/min.) and $H_2$ (700 cm$^3$/min.) (under normal conditions) to deposit SiC and carbon on the surface thereof, thereby forming a coating film.

The product was observed with a scanning electron microscope to find that neither cracks nor peeling was observed on the surface of the carbon/carbon composite or at the interface between the carbon/carbon composite and the coating film.

COMPARATIVE EXAMPLE 3

In order to compare the performances of material obtained by the process of the present invention with that obtained by the closest prior art, the following comparative tests were conducted.

PREPARATION OF TEST SAMPLE

A two-dimensional prepreg using phenolic resin and 2,000 pitch-based carbon filaments each 10 μm in diameter was cured, carbonized and then densified with an optically anisotropic pitch having a softening point of 280° C. The thus densified composite was graphitized at 2000° C. to obtain a carbon/carbon composite.

The carbon/carbon composite, which was found to comprise 60 vol. % of carbon filaments, was placed with metallic silicon in a furnace and subjected to conversion process at 1,800° C. to convert a part of the composite into SiC. Then, the surface was coated with SiC deposition by thermal CVD at 1,350° C. The pressure was 100 Torr and the feed gases were a mixture of $SiCl_4$ (170 cm$^3$/min)+$C_3H_8$ (40 cm$^3$/min)+$H_2$ (700 cm$^3$/min).

The thus converted and coated composite was observed using a scanning electron microscope (SEM) to find that a couple of layers of the carbon/carbon composite were converted into SiC and that the surface was coated with SiC by CVD.

TESTS AND EVALUATION

SiC-coated carbon/carbon composites were tested in oxidation tests. These tests were performed by heating the sample in the air to the desired temperature. Table 1 shows that the carbon/carbon composites with coating of the present invention has very high strength. SiC-coated carbon/carbon composites with a SiC/C-graded interface showed good results in comparison with the conventional SiC-coated carbon/carbon composites.

Test results thus obtained are shown in Table 1.

TABLE 1

| | The results of oxidation tests | |
|---|---|---|
| Sample | Comparative Example 3 | Present invention |
| Temperature (°C.) | 1600 | 1600 |
| Time (min) | 30 | 30 × 3 |
| Tensile Strength (MPa) | 230 | 550 |

As will be understood from the above test results, the material obtained by the process of the present invention showed high tensile strength as compared with that of the Comparative Example 3.

What is claimed is:

1. A process for producing a carbon/carbon composite having coatings consisting of both ceramics and carbon on the surface thereof, consisting essentially of the steps of:

1) heating a carbon/carbon composite at a temperature of from 800° to 1,700° C.;

2) contacting the thus heated composite from step 1) in the presence of hydrogen with at least one compound selected from the group consisting of halides and hydrides of Si, Zr, Ti, Hf, B, Nb and W in gaseous form to convert said surface of the carbon/carbon composite in the absence of a carbon releasing gas, into a carbide ceramic layer with a thickness of 0.5 to 200 μm;

3) forming a coating film comprising a ceramic by vapor phase decomposition in the presence of at least one compound selected from the group consisting of halides, hydrides and Organometallic compounds of the elements Si, Zr, Ti, Hf, B, Nb and W and mixtures thereof with a gas selected from the group consisting of hydrocarbon gas, hydrogen or inert gas at a pressure of 5–100 Torr on said carbide ceramic from step 2).

2. The process according to claim 1 wherein said carbon/carbon composite comprises carbon fibers and a carbonaceous matrix, said carbon/carbon composite having a volume, the amount of said carbon fibers being 10 to 70% by volume.

3. The process according to claim 2 wherein said carbon fibers include pitch, polyacrylonitrile and rayon carbon fibers.

4. The process according to claim 3 wherein said carbonaceous matrix is prepared by 1) carbonizing a carbonaceous pitch, 2) carbonizing phenolic or a furan resin or 3) chemical vapor deposition (CVD).

5. The process according to claim 4 wherein said said carbonaceous pitch includes coal and petroleum pitches of a softening point of 100° to 400° C.

6. The process according to claim 5 wherein said carbonaceous pitch is an optically isotropic or anisotropic pitch or a mixture thereof, and wherein said anisotropic pitch has an optically anisotropic phase content of 60 to 100% by volume.

7. The process according to claim 4 wherein said carbon/carbon composite is formed by impregnating carbon fibers with a carbonaceous pitch, a phenolic resin or a furan resin and carbonizing said impregnated carbon fibers by heating up to 400° to 3000° C. in an atmosphere of an inert gas.

8. The process according to claim 7 wherein said carbon/carbon composite is prepared from pitch carbon fibers and said composite is heated with a gaseous mixture of $SiCl_4$ and $H_2$ to form the carbide ceramic.

9. The process according to claim 1 wherein said coating film is formed by heating at a temperature of 1000°–3000° C. in step 3).

10. The process according to claim 1 wherein said coating in step 3) has a thickness of 1–2000 μm.

11. The process according to claim 1 wherein said carbide ceramic produces an increase in weight of said carbon/carbon composite of 0.1% to 15%.

12. The process according to claim 11 wherein said coating of step 3) comprises a ceramic and carbon.

* * * * *